United States Patent
Zidan et al.

(10) Patent No.: US 11,453,585 B2
(45) Date of Patent: Sep. 27, 2022

(54) FORMATION OF HIGH QUALITY ALANE

(71) Applicant: SAVANNAH RIVER NUCLEAR SOLUTIONS, LLC, Aiken, SC (US)

(72) Inventors: Ragaiy Zidan, Aiken, GA (US); Christopher S. McWhorter, Evans, GA (US); Patrick A. Ward, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 518 days.

(21) Appl. No.: 16/525,898

(22) Filed: Jul. 30, 2019

(65) Prior Publication Data

US 2021/0032103 A1 Feb. 4, 2021

(51) Int. Cl.
*C01B 6/06* (2006.01)
*B01D 9/00* (2006.01)

(52) U.S. Cl.
CPC ............... *C01B 6/06* (2013.01); *B01D 9/005* (2013.01); *B01D 9/0063* (2013.01); *C01P 2006/80* (2013.01)

(58) Field of Classification Search
CPC ........ C01B 6/06; B01D 9/005; B01D 9/0063; C01P 2006/80
USPC ........................................................ 423/645
See application file for complete search history.

(56) References Cited

U.S. PATENT DOCUMENTS

| | | | |
|---|---|---|---|
| 2,913,306 A | 11/1959 | Schechter | |
| 3,092,648 A | 6/1963 | Koster | |
| 3,383,186 A | 5/1968 | Chini et al. | |
| 3,387,947 A | 6/1968 | Brendel | |
| 3,801,657 A | 4/1974 | Scruggs | |
| 3,812,244 A | 5/1974 | Schmidt et al. | |
| 3,819,335 A | 6/1974 | Daniels et al. | |
| 3,838,194 A | 9/1974 | Reigier et al. | |
| 3,838,195 A | 9/1974 | Reigler et al. | |
| 3,840,654 A | 10/1974 | Schmidt et al. | |
| 3,857,930 A | 12/1974 | Kraus et al. | |
| 4,604,271 A | 8/1986 | Wagner et al. | |
| 6,228,338 B1 | 5/2001 | Petrie et al. | |
| 6,251,349 B1 | 6/2001 | Zaluska et al. | |
| 8,377,415 B2 | 2/2013 | Zidan et al. | |
| 8,470,156 B2 | 6/2013 | Zidan | |
| 9,199,844 B2 | 12/2015 | Zidan et al. | |
| 9,676,625 B1 | 6/2017 | Petrie et al. | |
| 9,850,585 B1 | 12/2017 | Zidan | |
| 10,138,122 B2 | 11/2018 | Zidan et al. | |
| 2001/0038821 A1 | 11/2001 | Petrie et al. | |
| 2005/0222445 A1 | 10/2005 | Lund et al. | |
| 2005/0226801 A1 | 10/2005 | Chin | |
| 2007/0066839 A1 | 3/2007 | Lund et al. | |
| 2007/0297964 A1 | 12/2007 | Soloveichik et al. | |
| 2009/0014225 A1 | 6/2009 | Ritter et al. | |
| 2009/0209409 A1 | 8/2009 | Soloveichik et al. | |
| 2009/0214409 A1 | 8/2009 | Chin et al. | |
| 2011/0236287 A1 | 9/2011 | Allen et al. | |
| 2012/0141363 A1 | 6/2012 | Zidan et al. | |
| 2014/0161703 A1 | 6/2014 | Elowe et al. | |
| 2015/0093325 A1 | 4/2015 | Fisher | |
| 2015/0093578 A1 | 4/2015 | Fisher | |
| 2015/0210543 A1 | 7/2015 | Fisher | |
| 2015/0307962 A1 | 10/2015 | Jelliss et al. | |
| 2016/0297678 A1 | 10/2016 | Stout et al. | |
| 2018/0226170 A1 | 8/2018 | Zidan et al. | |

FOREIGN PATENT DOCUMENTS

| WO | WO 96/015279 | 5/1996 |
|---|---|---|
| WO | WO 2015/123438 | 8/2015 |

OTHER PUBLICATIONS

Agresti, et al. "Evidence of formation of LiBH$_4$ by high energy ball milling of LiH and B in a hydrogen atmosphere" *Scripta Materiala* 60(9) (2009) pp. 753-755.
Bulychev, et al. "'Direct' Synthesis of Unsolvated Aluminum Hydride Involving Lewis and Bronsted Acids" *Russ. J. Inorg. Chem.* 53(7) (2008) pp. 1000-1005.
Huot, et al. "Mechanochemical synthesis of hydrogen storage materials" *Prog. Mater. Sci.* 58(1) (2013) pp. 30-75.
Tskhai, et al, "The Kinetics and a Mathematical Model of the Isothermal Crystallisation of Aluminum Hydride from Ether-Toluene Solutions" *Russ. J. Inorg. Chem.* 37(8) (1992) pp. 877-885.

*Primary Examiner* — Edward M Johnson
(74) *Attorney, Agent, or Firm* — Dority & Manning, P.A.

(57) ABSTRACT

Methods for forming alane are described. The method includes addition of toluene at a temperature above the crystallization temperature of alane to a lower temperature solution that includes alane adduct, ether, and toluene. Upon the addition, a crystallization mixture is formed that is at or near the crystallization temperature of alane. The alane of the mixture crystallizes over a period of time to form a high purity alane polymorph.

19 Claims, 4 Drawing Sheets

FORMATION OF HIGH QUALITY ALANE

STATEMENT REGARDING FEDERALLY SPONSORED RESEARCH OR DEVELOPMENT

This invention was made with government support under Contract No. DE-AC09-08SR22470 awarded by the U.S. Department of Energy. The government has certain rights in the invention.

This application and technology are controlled pursuant to ITAR Category IV.j.

STATEMENT REGARDING A JOINT RESEARCH AGREEMENT

This invention was made as part of a Cooperative Research and Development Agreement (CRADA) between Ardica Technologies, Inc. and Savannah River National Laboratory.

BACKGROUND

Aluminum hydride, $AlH_3$, (also referred to as alane) has long been known as a useful reducing agent in organic synthesis. Alane forms numerous polymorphs, the most thermally stable of which and the form most sought after in industrial application being α-alane, which has a cubic or rhombohedral crystalline morphology. The potential for use of α-alane in hydrogen storage applications is especially attractive due to a theoretical gravimetric capacity of approximately 10 wt. %, a volumetric capacity of about 1.48 $g/cm^3$, and a desorption temperature of about 130° C., which provides an ability to release substantially all stored hydrogen effectively on demand. Such potential could be quite beneficial in solid phase storage of hydrogen for use as a fuel (for instance, in a fuel cell applications) and in solid energy applications (for instance, as a propellant).

Alane monomer is thermodynamically unstable and as a result, in order to obtain significant alane product, the monomer must be formed at high pressure or stabilized immediately upon formation. By use of a suitable electron donating solvent (e.g., diethyl ether or tetrahydrofuran), alane adduct can be formed to stabilize the nascent monomeric product. Following formation of the stable adduct, the alane must still be crystallized and passivated to provide the desired polymorph. Unfortunately, isolating the alane from other materials contained in the reaction mixture, including impurities, excess reactants, and in some cases, the adduct complex partner itself, under conditions that crystallizes the desired alane phase in sufficient yield remains economically unfeasible and can also present safety issues. These economic and safety issues have prevented development of many potentially beneficial uses of alane.

The most widely used alane formation method today is the DOW process in which a low concentration solution of alane etherate in ether is slowly added to a heated toluene bath followed by ether evaporation to crystallize the alane. Unfortunately, this method can create many different alane phases in combination (α-alane, α'-alane, γ-alane) as the addition of the low concentration solution to the crystallization temperature bath in conjunction with the evaporation of ether reduces the temperature in the bath, which leads to an impure product. The requirement of a low concentration alane etherate solution (to maintain the alane adduct in the liquid phase) also significantly limits batch size, increasing costs and production times.

In another approach, a slurry of a more highly concentrated mixture of toluene and alane etherate adduct is formed which reduces solvent requirements and increases processing speed, but has significant safety barriers. Transfer of the slurry can clog lines, and the air- and shock-sensitivity of the adduct gives rise to hazardous conditions left over on reaction vessel walls when utilizing this slurry method.

What is needed in the art is an economical and safe method for formation of alane. For instance, a method that can provide a route for safe and fast crystallization of a high purity alane product (e.g., α-alane) from an alane adduct reaction mixture would be of great benefit.

SUMMARY

According to one embodiment, disclosed is a method for forming a high purity alane. A method can include combining an alane adduct, one or more crystallization aids such as $LiBH_4$ and $LiAlH_4$, an ether, and a first amount of toluene to form a liquid mixture. The liquid mixture can include the ether in an amount of from about 1 vol. % to about 50 vol. %. This liquid mixture can be at a temperature that is below the crystallization temperature of alane, for instance, from about 15° C. to about 45° C. A second amount of toluene can then be added to this liquid mixture to form a crystallization mixture. This second amount of toluene can be at a temperature that is greater than the temperature of the liquid mixture, e.g., from about 70° C. to about 110° C. The temperature of the crystallization mixture formed upon the addition of the second amount of toluene to the liquid mixture can be from about 70° C. to about 80° C. Following formation, the crystallization mixture can be held in a targeted temperature range (about 70° C. to about 80° C.) for a period of from about 2 hours to about 5 hours to form the crystallized alane.

Also disclosed is a method for forming high purity α-alane, e.g., about 99.9% pure α-alane. This method can include combining an alane adduct, an ether, and a first amount of toluene to form a liquid mixture that can include the ether in an amount of from about 1 vol. % to about 15 vol. %. This liquid mixture can be at a temperature that is below the crystallization temperature of alane, for instance, from about 15° C. to about 45°. A second amount of toluene can then be added to this liquid mixture to form a crystallization mixture. This second amount of toluene can be at a temperature that is greater than the temperature of the liquid mixture, e.g., from about 85° C. to about 110° C. The temperature of the crystallization mixture upon the addition of the second amount of toluene to the liquid mixture can be from about 70° C. to about 80° C. Following formation, the crystallization mixture can be held in a targeted temperature range (about 70° C. to about 80° C.) for a period of from about 3 hours to about 5 hours while distilling excess ether to form a high purity (e.g., greater than about 99%) polymerized α-alane.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
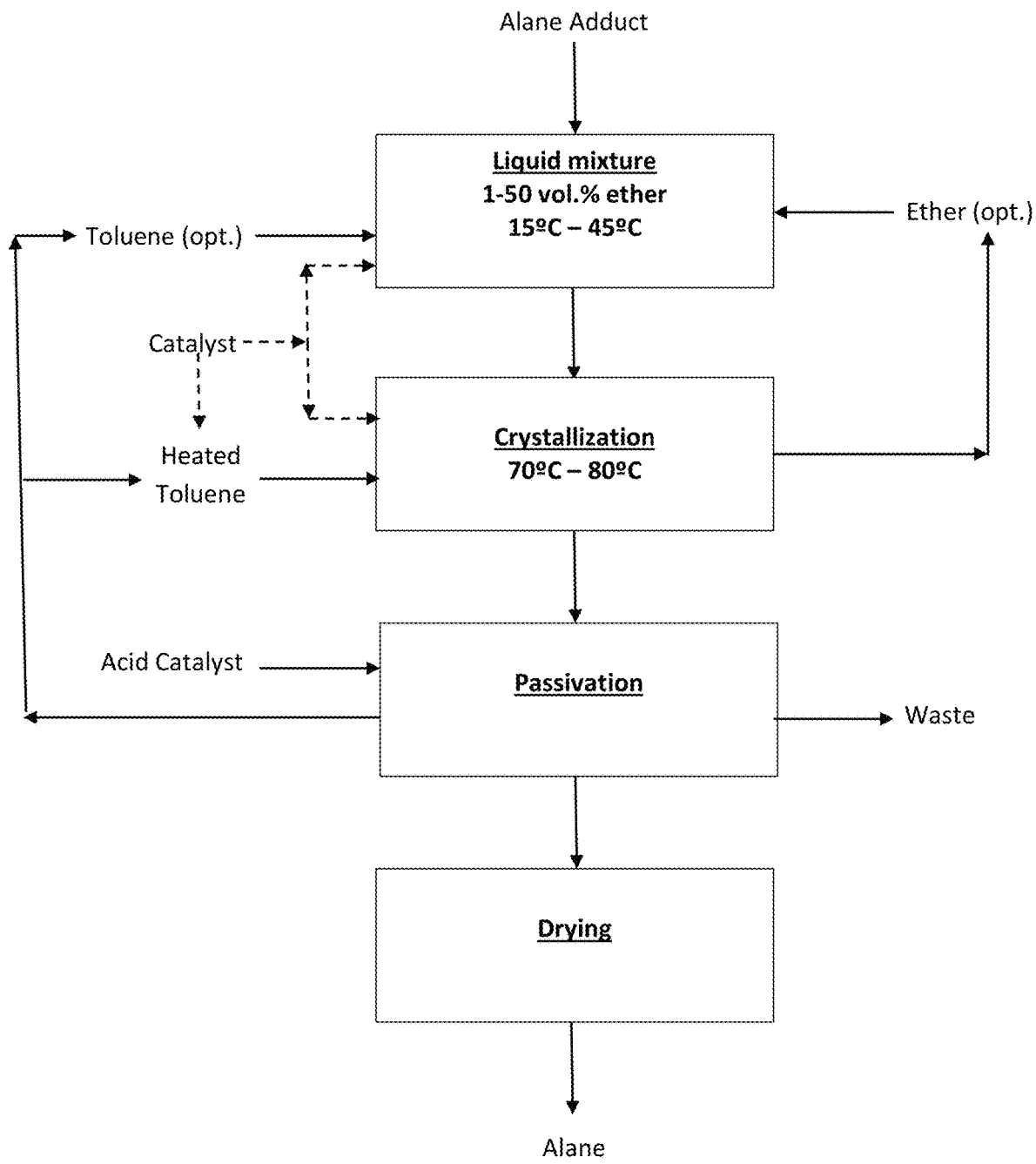
FIG. 1 provides a flow diagram for an alane formation process as described herein.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment may be used in another embodiment to yield a still further embodiment.

In general, the present disclosure is directed to methods for forming alane, and in one particular embodiment, for forming high purity alane, and in one particular embodiment, high purity α-alane. More specifically, disclosed are methods for crystallizing alane from an alane adduct that can be carried out quickly while mitigating risks and can provide any desired alane polymorph at high purity. For instance, high purity (e.g., 99.9% purity or higher) α-alane can be formed that can exhibit long shelf life, as well as other desirable qualities.

The methods can provide benefits both in improved economics and safety in the formation processes as well as providing for formation of a highly pure alane of any desired polymorph. For instance, by use of disclosed methods, α-alane, α'-alane, or γ-alane can be formed with the desired polymorph being present in the polymerized alane product in an amount of about 99% or greater in some embodiments.

To provide the desired alane polymorph with high purity, disclosed methods achieve crystallization temperature uniformity quickly in a crystallization mixture that has a relatively low and well-controlled ether content. As such, the ether component of the crystallization mixture can be brought to a very low concentration early in the crystallization process. Moreover, the crystallization temperature of the crystallization mixture can be reached very quickly, within minutes in most embodiments. By achieving both of these goals, the method can quickly and safely produce the desired alane polymorph at high purity.

FIG. 1 presents a flow diagram illustrating one embodiment of an alane production method. As illustrated, a liquid mixture is initially formed that includes an alane adduct in conjunction with from about 1 to about 50 vol. % of an ether.

While the alane adduct can be an etherate adduct of alane and diethyl ether ($AlH_3:E_2Ot$), this is not a requirement and other alane adducts can alternatively be utilized. For instance, suitable Lewis bases of an adduct can include other ethers and amines such as, and without limitation, straight chain, branched, or cyclic alkyl ethers (e.g., tetrahydrofuran, etc.), straight chain, branched or cyclic amines (e.g., ethyl amine, diethyl amine, tri-ethyl amines, tri-methyl amines, aniline, etc.), or combinations thereof.

Figure 2:
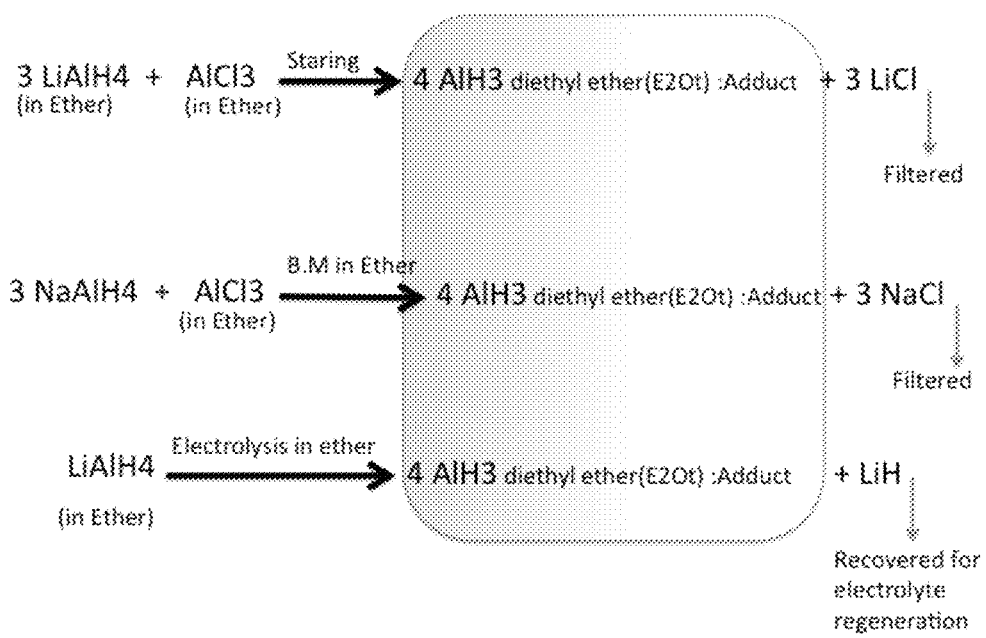
FIG. 2 illustrates several different methods as may be utilized in formation an alane adduct as may be crystallized and purified according to disclosed methods.

The formation method used in obtaining the alane adduct is also not critical to the disclosed methods. FIG. 2 illustrates several representative and non-limiting methods for forming an alane adduct that can be processed as described herein. For instance, in one embodiment, an alane adduct can be formed through a traditional preparation method in which lithium aluminum hydride in ether is treated with aluminum trichloride in ether, to form an alane etherate adduct in ether and lithium chloride, which can be removed by filtration. An electrolysis method can be utilized in one embodiment, in which lithium aluminum hydride is processed to form an alane etherate adduct and lithium hydride, which can be recovered for regeneration.

In yet another embodiment, a mechanochemical solid/liquid reaction formation method can be utilized as described in U.S. Pat. No. 10,138,122, which is incorporated herein by reference. According to this method, a solid phase alkali metal and an aluminum halide can be reacted in the presence of a liquid phase Lewis base with the addition of energy obtained by use of a mechanical treatment via, e.g., a ball mill or the like. The mechanical treatment can provide energy that can encourage reaction between the solid reactants to form alane. The presence of the Lewis Base can stabilize the alane as it is formed so as to provide the continuous formation of the alane adduct over the course of the alane formation process.

Referring again to FIG. 1, a liquid mixture to be processed according to the disclosed methods can include the alane adduct in conjunction with an ether. In one embodiment, the ether can be diethyl ether, but other ethers are also encompassed herein including, without limitation, straight chain, branched, or cyclic alkyl ethers.

The amount of ether present in this liquid mixture can vary depending upon the particular alane polymorph to be formed. In general, the liquid composition can include the ether component in an amount of from about 1 vol. % to about 50 vol. %. For instance, in those embodiments in which the desired product alane is α-alane, the liquid mixture can include the ether component in an amount of from about 1 vol. % to about 15 vol. %, from about 1 vol. % to about 10 vol. %, or about 5 vol. % in some embodiments. In those embodiments in which the desired product alane is α'-alane, the liquid mixture can include the ether component in an amount of from about 25 vol. % to about 50 vol. %, from about 30 vol. % to about 40 vol. %, or about 35 vol. % in some embodiments. In those embodiments in which the desired product alane is γ-alane, the liquid mixture can include the ether component in an amount of from about 1 vol. % to about 15 vol. %, from about 5 vol. % to about 15 vol. %, or about 10 vol. % in some embodiments.

As indicated in FIG. 1, depending upon the characteristics of the alane adduct composition that is introduced to the process and the alane polymorph to be formed by the process, it may be desirable to add an amount of ether to the liquid mixture.

The amount of the alane adduct included in the liquid mixture can also vary, generally depending upon the total volume of the crystallization mixture. For instance, in those embodiments in which the total volume of the mixture to be processed (the crystallization mixture) is from about 5 liters to about 15 liters, or from about 9 liters to about 12 liters in some embodiments, the amount of alane adduct added to the mixture can be enough to yield from about 100 grams to about 300 grams of alane.

The remainder of the liquid mixture can include toluene or any other non-reactive hydrocarbon solvent in conjunction with any process additives (e.g., catalysts) or excess reactants, impurities, etc. in the alane adduct composition that is provided to the process, e.g., remaining in the composition following the alane adduct formation process. For instance, a liquid mixture can include from about 50 vol. % to about 99 vol. % toluene, depending upon the particular alane polymorph to be formed. For example, in forming either α-alane or γ-alane, the liquid mixture can in one embodiment include from about 85 vol. % to about 99 vol. % toluene. When forming α'-alane, however, the liquid mixture can in one embodiment include less toluene and more ether, for instance from about 50 vol. % to about 75 vol. % toluene.

To affect crystallization of alane contained in the liquid mixture, a crystallization mixture can be formed by adding an amount of heated toluene or any other non-reactive hydrocarbon solvent to the liquid mixture. The toluene that is added to the liquid mixture is provided at a temperature that is greater than the crystallization temperature of the alane. For instance, the toluene that is added to the liquid mixture can be at a temperature of from about 65° C. to about 110° C. The temperature of the toluene added to the liquid mixture can vary depending upon the particular alane polymorph to be formed. For instance, in those embodiments in which the product alane is α-alane, the added toluene can be at a temperature of from about 85° C. to about 110° C., from about 90° C. to about 100° C., or about 95° C. in some embodiments. In those embodiments in which the product alane is α'-alane, the added toluene can be at a temperature of from about 65° C. to about 100° C., from about 70° C. to about 95° C., or about 90° C. in some embodiments. In those embodiments in which the product alane is γ-alane, the added toluene can be at a temperature of from about 85° C. to about 110° C., from about 90° C. to about 100° C., or about 95° C. in some embodiments.

The volume ratio of the heated toluene to the liquid mixture in the as-formed crystallization mixture can be from about 2 to about 5, from about 2.5 to about 4, or about 3 in some embodiments. For instance, in one embodiment from about 7 to about 9 liters of heated toluene can be added to from about 2 to about 3 liters of the liquid mixture.

In addition to the alane adduct, ether, and toluene, a polymerization catalyst, as is generally known in the art, can be present in the crystallization mixture. For instance, a desolvating species can be included in the crystallization mixture as catalyst. Exemplary desolvating species can include, without limitation, a complex metal hydride (e.g., $LiAl_4$, $LiBH_4$, $LiAlH_4$, etc.) or a metal halide (e.g., LiCl). See, e.g., A. N. Tskhai et al. Rus. J. Inorg. Chem. 37:877 (1992), and U.S. Pat. No. 3,801,657 to Scruggs, which is incorporated herein by reference for additional examples. As indicated in FIG. 1, a catalyst, when incorporated in a process, can be added to the liquid mixture or to the crystallization mixture, either in conjunction with or independently of the heated toluene. In one embodiment, a catalyst can be added to the alane adduct liquid mixture, which can improve effectiveness of the catalyst. For instance, in those embodiments in which high purity α-alane is formed, it may be beneficial to add catalyst additives to the liquid mixture, prior to addition of the heated toluene and formation of the crystallization mixture.

Through relatively rapid addition of the heated toluene to the concentrated alane liquid mixture, the crystallization mixture thus formed can be brought to the crystallization temperature quickly. For instance, the heated toluene can be added to the liquid mixture over a period of a few minutes, e.g., about 5 minutes or less. As the heated toluene is added to the liquid mixture the combined mixture increases in temperature and upon completion of the addition, the crystallization mixture thus formed can have a temperature at or near the crystallization temperature of the alane, e.g., from about 70° C. to about 80° C., or from about 75° C. to about 80° C. in some embodiments (e.g., in formation of α-alane or γ-alane). Beneficially, through addition of the heated toluene to the alane adduct mixture, rather than addition of an alane adduct mixture to toluene followed by heating as has been done in the past, the alane adduct can be quickly brought to the crystallization temperature at a very low ether concentration. This addition process can improve temperature control of the system and the purity of the resulting alane can be greatly improved as compared to previously known methods.

Following addition of the heated toluene to the liquid mixture to form the crystallization mixture, the temperature of the crystallization mixture can be maintained over several hours, e.g., from about 2 to about 5 hours, over the course of which the alane can polymerize. For instance, upon holding the crystallization mixture at a temperature of from about 75° C. to about 80° C. for a period of from about 3 hours to about 5 hours, high purity α-alane can be formed. High purity α'-alane can be formed from a suitably prepared crystallization mixture at a temperature of from about 70° C. to about 80° C. over a period of from about 3 hours to about 5 hours, and high purity γ-alane can be formed from a suitably prepared crystallization mixture held at a temperature of from about 75° C. to about 80° C. over a period of from about 2 hours to about 4 hours.

In general, excess ether can be distilled from the crystallization mixture as the polymerization process is carried out. This is not a requirement, however, and in some embodiments, for instance in formation of α'-alane, it may not be necessary to distill excess ether from the reaction mixture. As shown, ether that is distilled off of the crystallization mixture can be recycled for reuse in the process.

Upon completion of the crystallization process, e.g., after a period of from about 2 hours to about 5 hours, depending upon the primary alane polymorph to be formed, the resulting product can be passivated to stabilize the alane and dried according to standard practice. For instance, a weak acid solution (e.g., a 1% to 5% hydrochloric acid solution) may be added to the mixture such that the polymerized alane contacts the weak acid solution for a period of time to create an aluminum oxide coating on the surface of the alane. Other mineral acids or buffered solutions of these acids may also be used in a passivation step, such as phosphoric acid ($H_3PO_4$), sulfuric acid ($H_2SO_4$), boric acid ($H_3BO_3$), hydrofluoric acid (HF), hydrobromic acid (HBr), hydroiodic acid (HI), and mixtures thereof. Following any passivation step, the product alane may then be separated from the remaining materials and dried. As shown, useful recovered materials, such as toluene or other additives to the process, can be reused, while other materials can be discarded as waste.

The present disclosure may be better understood with reference to the example set forth below.

Example 1

An alane etherate adduct concentrate mixture including enough alane etherate to yield 250 g of α-alane dissolved in a solvent including 95 vol. % toluene and 5 vol. % diethyl ether was formed. 8 Liters of 95° C. toluene was added to 2 liters of this mixture at 35° C. The resulting crystallization mixture was at a temperature of 78° C. This solution was held at temperature while continuously distilling excess diethyl ether for 4.5 hours to form a high purity α-alane.

Figure 3:
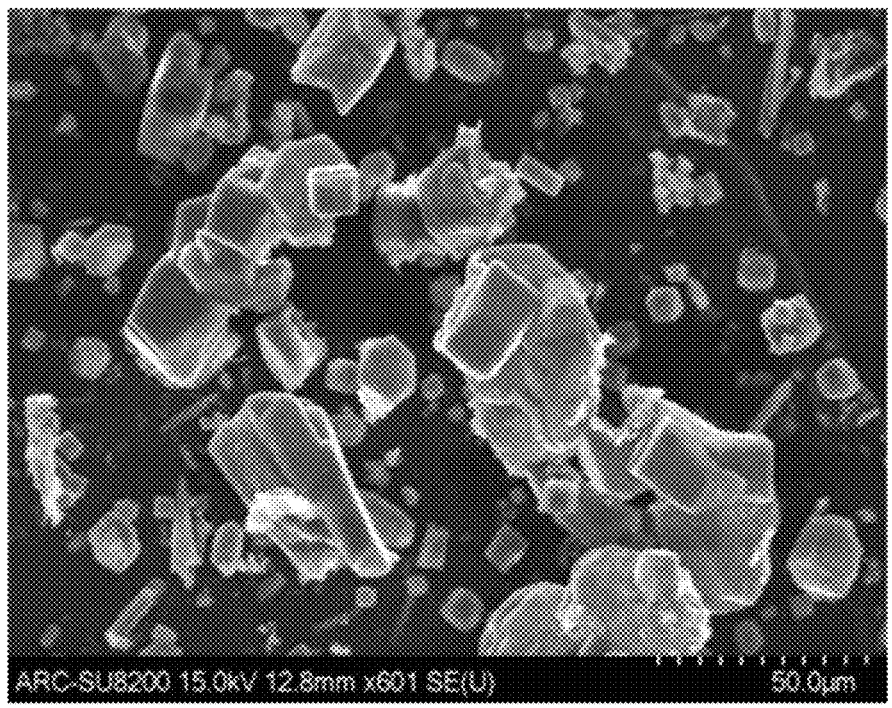
FIG. 3 is a scanning electron microscope (SEM) image of α-alane formed according to disclosed methods.
Figure 4:
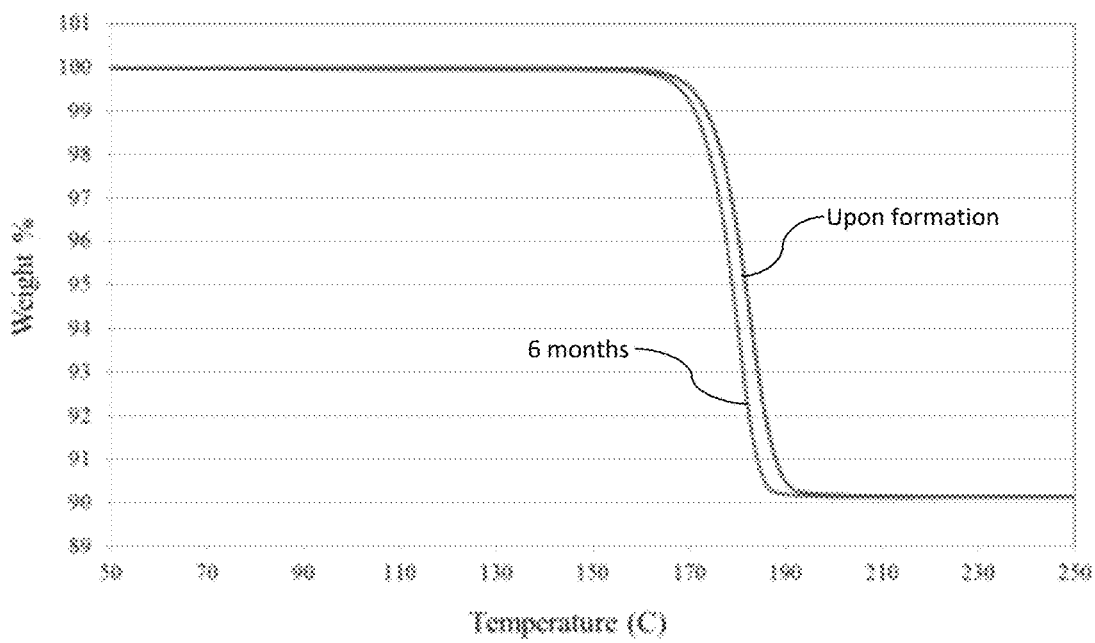
FIG. 4 illustrates thermogravimetric analysis (TGA) of α-alane formed according to disclosed methods upon formation and following storage for 6 months.
Figure 5:
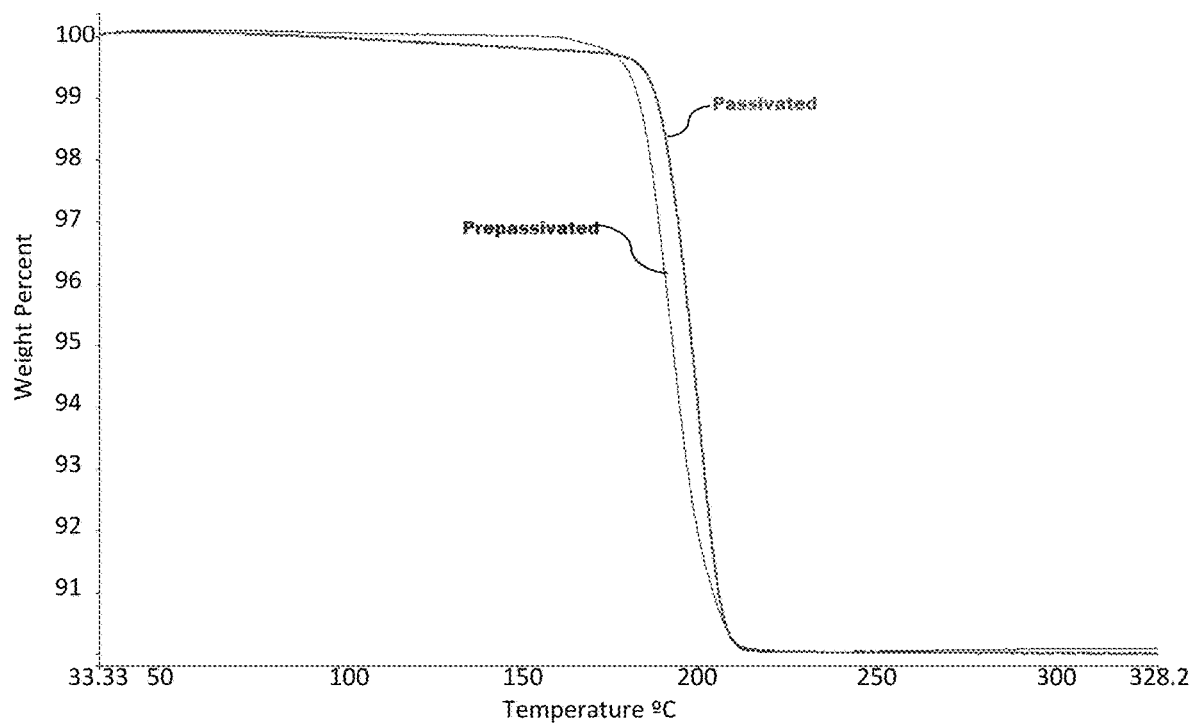
FIG. 5 illustrates TGA of α-alane formed according to disclosed methods prior to and following passivation.
Figure 6:
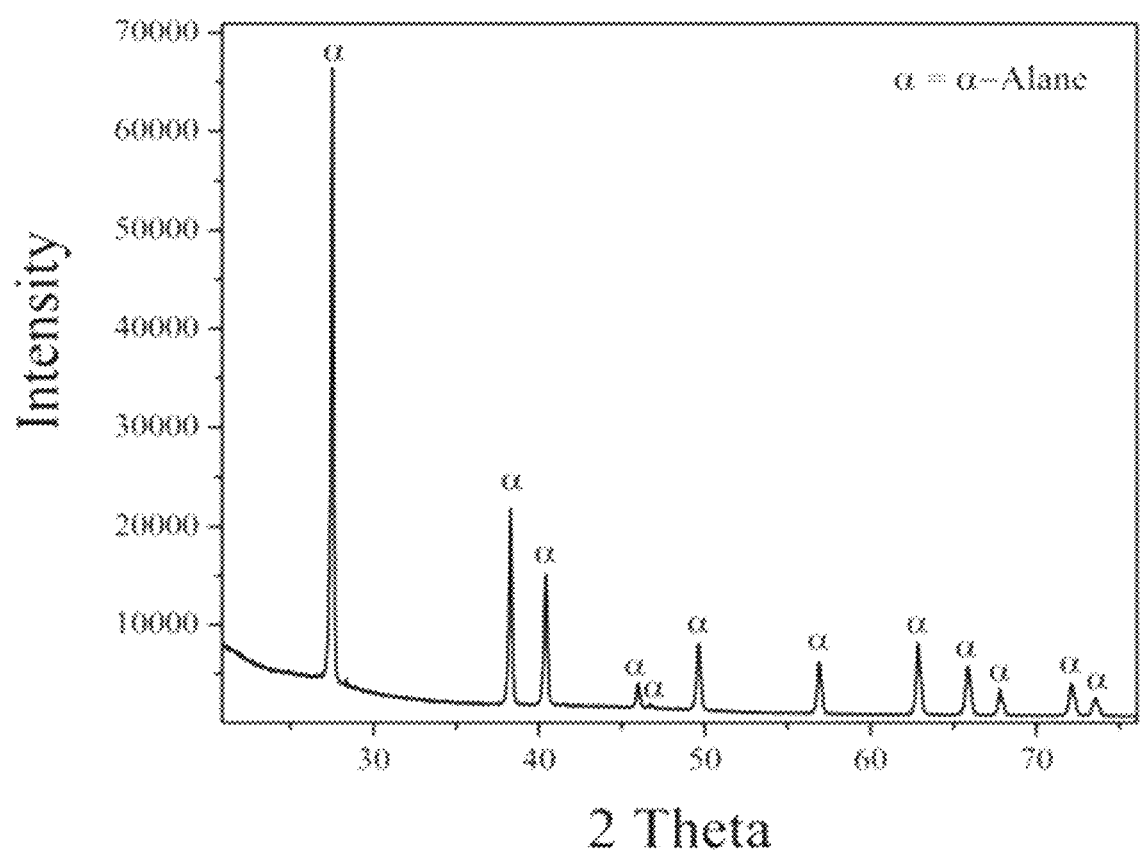
FIG. 6 illustrates X-ray diffraction (XRD) data of α-alane formed according to disclosed methods.

An SEM of the product alane is provided in FIG. 3. FIG. 4 illustrates the TGA of the product alane immediately upon formation and following 6 months of storage. As shown the α-alane product was highly stable. FIG. 5 illustrates the TGA of the product alane before and after passivation, again demonstrating that the product was highly stable α-alane product. FIG. 6 presents the XRD of the α-alane product.

Example 2

An alane etherate adduct concentrate mixture including enough alane etherate to yield 200 g of α'-alane dissolved in a solvent including 65 vol. % toluene and 35 vol. % diethyl ether was formed. 8 Liters of 90° C. toluene was added to 2 liters of this mixture at 30° C. The resulting crystallization mixture was at a temperature of 76° C. This solution was held at temperature while slowly distilling excess diethyl ether for 4 hours to form a high purity α'-alane.

Example 3

An alane etherate adduct concentrate mixture including enough alane etherate to yield 250 g of γ-alane dissolved in a solvent including 90 vol. % toluene and 10 vol. % diethyl ether was formed. 8 Liters of 95° C. toluene was added to 2 liters of this mixture at 35° C. The resulting crystallization mixture was at a temperature of 78° C. This solution was held at temperature while continuously distilling excess diethyl ether for 2.75 hours to form a high purity γ-alane.

While certain embodiments of the disclosed subject matter have been described using specific terms, such description is for illustrative purposes only, and it is to be understood that changes and variations may be made without departing from the spirit or scope of the subject matter.

What is claimed is:

1. A method for forming alane comprising:
   combining an alane adduct, an ether, and a first amount of toluene to form a liquid mixture, the liquid mixture including the ether in an amount of from about 1 vol. % to about 50 vol. %;
   adding a second amount of toluene to the liquid mixture to form a crystallization mixture, wherein at the addition, the liquid mixture is at a temperature of from about 15° C. to about 45° C. and the second amount of toluene is at a temperature that is greater than the crystallization temperature of the alane, wherein upon the addition, the crystallization mixture thus formed is at a temperature of from about 70° C. to about 80° C.; and
   maintaining the crystallization mixture at a temperature of from about 70° C. to about 80° C. for a period of from about 2 hours to about 5 hours, the alane of the alane adduct polymerizing during the period.

2. The method of claim 1, wherein the alane adduct is an alane etherate adduct.

3. The method of claim 1, wherein the liquid mixture includes the ether in an amount of from about 1 vol. % to about 15 vol. %.

4. The method of claim 1, wherein the liquid mixture includes the ether in an amount of from about 25 vol. % to about 50 vol. %.

5. The method of claim 1, wherein the ether comprises diethyl ether.

6. The method of claim 1, wherein the second amount of toluene is at a temperature of from about 65° C. to about 110° C.

7. The method of claim 1, wherein the second amount of toluene is at a temperature of from about 65° C. to about 100° C.

8. The method of claim 1, wherein the second amount of toluene is at a temperature of from about 85° C. to about 110° C.

9. The method of claim 1, further comprising distilling the ether from the crystallization mixture during the period.

10. The method of claim 1, further comprising passivating the crystalized alane.

11. The method of claim 1, the polymerized alane comprising α-alane in an amount of about 99% or greater.

12. The method of claim 1, the polymerized alane comprising α'-alane in an amount of about 99% or greater.

13. The method of claim 1, the polymerized alane comprising γ-alane in an amount of about 99% or greater.

14. A method for forming α-alane comprising:
    combining an alane adduct, an ether, and a first amount of toluene to form a liquid mixture, the liquid mixture including the ether in an amount of from about 1 vol. % to about 15 vol. %;
    adding a second amount of toluene to the liquid mixture to form a crystallization mixture, wherein at the addition, the liquid mixture is at a temperature of from about 15° C. to about 45° C. and the second amount of toluene is at a temperature of from about 85° C. to about 110°, wherein upon the addition, the crystallization mixture thus formed is at a temperature of from about 70° C. to about 80° C.;
    maintaining the crystallization mixture at a temperature of from about 70° C. to about 80° C. for a period of from about 3 hours to about 5 hours; and
    distilling the ether from the crystallization mixture during the period, the alane of the alane adduct polymerizing during the period, the polymerized alane comprising α-alane in an amount of about 99% or greater.

15. The method of claim 14, wherein the alane adduct is an alane etherate adduct.

16. The method of claim 14, wherein the ether comprises diethyl ether.

17. The method of claim 14, further comprising passivating the polymerized alane.

18. The method of claim 14, further comprising drying the polymerized alane.

19. The method of claim 14, the polymerized alane comprising α-alane in an amount of about 99.9% or greater.

* * * * *